US008219108B2

United States Patent
Lee et al.

(10) Patent No.: US 8,219,108 B2
(45) Date of Patent: Jul. 10, 2012

(54) SMART RADIO COMMUNICATION SYSTEM AND METHOD OF OPERATING THE SAME

(75) Inventors: Seung-Hwan Lee, Daejeon (KR); Jin Up Kim, Daejeon (KR); Kyu Tae Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 400 days.

(21) Appl. No.: 12/533,109

(22) Filed: Jul. 31, 2009

(65) Prior Publication Data

US 2010/0151877 A1 Jun. 17, 2010

(30) Foreign Application Priority Data

Dec. 16, 2008 (KR) .................. 10-2008-0127925

(51) Int. Cl.
*H04W 4/00* (2009.01)
(52) U.S. Cl. ........ 455/453; 455/436; 370/338; 370/328; 370/331; 370/330; 370/329; 370/348
(58) Field of Classification Search .................. 455/436, 455/453; 370/338, 328, 331, 330, 329, 348
See application file for complete search history.

(56) References Cited

U.S. PATENT DOCUMENTS

| 6,512,752 B1 * | 1/2003 | H'mimy et al. ............... 370/329 |
| 2005/0119006 A1 | 6/2005 | Cave et al. |
| 2006/0262750 A1 * | 11/2006 | Walton et al. ................. 370/329 |
| 2007/0189214 A1 * | 8/2007 | Hyon et al. .................... 370/329 |
| 2007/0255797 A1 * | 11/2007 | Dunn et al. .................... 709/217 |
| 2010/0014455 A1 * | 1/2010 | Oulai et al. .................... 370/328 |

FOREIGN PATENT DOCUMENTS

WO 2007/071600 A1 6/2007

* cited by examiner

*Primary Examiner* — Pierre-Louis Desir
(74) *Attorney, Agent, or Firm* — Ladas & Parry LLP

(57) ABSTRACT

Provided is a method of operating a smart radio communication system, the method including: collecting information associated with each of a plurality of radio access technologies (RATs) through an access to the plurality of RATs; receiving a type of a service, requested by a terminal, via a first RAT accessing the terminal among the plurality of RATs; selecting an optimal channel based on the collected information and the received type of the service; and transmitting a content corresponding to the service via the selected optimal channel.

7 Claims, 13 Drawing Sheets

DATA TRANSMISSION RATE : FEMTO > PICO > MICRO > MACRO
MOBILITY : FEMTO < PICO < MICRO < MACRO

SMART RADIO COMMUNICATION SYSTEM AND METHOD OF OPERATING THE SAME

CROSS-REFERENCE TO RELATED APPLICATION

This application claims the benefit of Korean Patent Application No. 10-2008-0127925, filed on Dec. 16, 2008, in the Korean Intellectual Property Office, the disclosure of which is incorporated herein by reference.

BACKGROUND

1. Field of the Invention

Embodiments of the present invention relate to a smart radio communication system.

2. Description of the Related Art

In a current radio communication system, since frequency band is fixed for each service and accepted standards must be followed, there are limitations on changing the frequency band depending on a radio channel environment and a service type to find an optimal radio channel. Also, it is possible to access only one particular standard at a particular point in time with one user terminal. Accordingly, when the user receives at least one radio communication service, it may be impossible to find an optimal communication channel for each service.

In view of the frequency band use, the current radio communication system may not purposefully be balanced between the frequency band with a high spectrum use rate and the frequency band with a low spectrum use rate. Therefore, the entire frequency band use efficiency may be significantly low.

Accordingly, there is a need for a smart radio communication system that may provide a service via an optimal channel based on a radio environment and a service requirement, which is suitable for frequency, time, and space, in order to satisfy various types of user requests, and to effectively use limited time and frequency resources.

SUMMARY

An aspect of the present invention provides a smart radio communication system that may effectively manage limited frequency resources by effectively using time, space, and frequency.

Another aspect of the present invention also provides a smart radio communication system that may construct an optimal channel to be suitable for each service characteristic by effectively using limited frequency resources.

Another aspect of the present invention also provides a smart radio communication system that may perform a communication while changing a frequency band according to a service type or a user request, based on a spectrum pool.

Another aspect of the present invention also provides a smart radio communication system that may transmit and receive a content by separately using a data channel and a common control channel, to decrease a load of moving a frequency band while performing a data communication.

Another aspect of the present invention also provides a smart radio communication system that may receive various types of information required to change a frequency band, a bandwidth, and the like according to a user environment, a service type, and the like, and thereby may prevent a time latency and a performance deterioration caused by a change in the frequency band, the bandwidth, and the like.

Another aspect of the present invention also provides a smart radio communication system that may hand off between cells included in a multi-layered cell based on a velocity, a data rate, and the like, and thereby may perform a communication while changing an optimal channel to be suitable for a situation.

Another aspect of the present invention also provides a smart radio communication system that may provide various types of radio communication services based on a spectrum efficiency to thereby enhance efficiency of frequency utilization and improve economical gains.

Another aspect of the present invention also provides a smart radio communication system that may perform a communication via a Common Pilot Channel Base Station (CPC BS), and thereby reduce an equity problem between providers that may occur when a Global Control Plane (GCP) unilaterally allocates an optimal channel to a smart radio terminal.

The present invention is not limited to the above purposes and other purposes not described herein will be apparent to those of skill in the art from the following description.

According to an aspect of the present invention, there is provided a method of operating a smart radio communication system, the method including: collecting information associated with each of a plurality of radio access technologies (RATs) through an access to the plurality of RATs; receiving a type of a service, requested by a terminal, via a first RAT accessing the terminal among the plurality of RATs; selecting an optimal channel based on the collected information and the received type of the service; and transmitting a content corresponding to the service via the selected optimal channel.

In this instance, the method may further include changing the selected optimal channel based on a velocity of the terminal or a transmission speed of the content.

Also, the changing of the selected optimal channel may include handing off between cells included in a multi-layered cell, based on the velocity or the transmission speed.

Also, the transmitting of the content corresponding to the service via the selected optimal channel may include: determining a download time for a type of each service based on a spectrum efficiency of the optimal channel for each time zone; and transmitting the content to the terminal at the determined download time.

Also, the transmitting of the content at the determined download time may include: transmitting a main content corresponding to a main service to the terminal at the determined download time; and transmitting a content corresponding to another service with the same determined download time based on an extra channel capacity of the optimal channel.

When the selected optimal channel is a first channel between the first RAT and the terminal, the transmitting of the content corresponding to the service via the selected optimal channel may include transmitting the content to the terminal via the first channel.

Conversely, when the selected optimal channel is not the first channel between the first RAT and the terminal, the transmitting of the content corresponding to the service via the selected optimal channel may include: transmitting, to the terminal, an access change command to use a second RAT associated with the selected optimal channel; and transmitting the content to the terminal via a second channel between the second RAT and the terminal.

Also, the collecting of the information may include collecting the information using a common control channel when accessing the plurality of RATs. The common control channel may exist in a separate frequency band from a data channel including the optimal channel.

According to another aspect of the present invention, there is provided a method of operating a smart radio communication system, the method including: collecting information associated with each of a plurality of RATs through an access to the plurality of RATs; providing a terminal with the collected information via a base station; receiving a type of a service requested by the terminal via a first RAT among the plurality of RATs, when the terminal accesses the first RAT using the collected information; selecting an optimal channel based on the collected information and the received type of the service; and providing the terminal with a content corresponding to the service via the selected optimal channel.

When the selected optimal channel is a first channel between the first RAT and the terminal, the providing of the content may include transmitting the content to the terminal via the first channel.

Conversely, when the selected optimal channel is not the first channel between the first RAT and the terminal, the providing of the content may include: transmitting, to the terminal, an access change suggestion to use a second RAT associated with the selected optimal channel; and transmitting the content to the terminal via a second channel between the second RAT and the terminal, when the terminal accepts the access change suggestion.

Also, the method may further include changing the selected optimal channel based on a velocity of the terminal or a transmission speed of the content.

Also, the changing of the selected optimal channel may include handing off between cells included in a multi-layered cell, based on the velocity or the transmission speed.

Also, the providing of the content may include: determining a download time for a type of each service based on a spectrum efficiency of the optimal channel for each time zone; and transmitting the content to the terminal at the determined download time.

Also, the transmitting of the content at the determined download time may include: transmitting a main content corresponding to a main service to the terminal at the determined download time; and transmitting a content corresponding to another service with the same determined download time based on an extra channel capacity of the optimal channel when transmitting the main content.

Also, the collecting of the information may include collecting the information using a control channel when accessing the plurality of RATs.

The base station may include a CPC BS.

According to still another aspect of the present invention, there is provided a method of operating a smart radio communication system, the method may include: receiving information associated with each of a plurality of RATs; selecting an optimal channel for a type of each service using the received information; and receiving a content corresponding to the service via the selected optimal channel.

In this instance, the method may further include changing the selected optimal channel based on a velocity of a terminal or a transmission speed of the content.

Also, the changing of the selected optimal channel may include handing off between cells included in a multi-layered cell, based on the velocity or the transmission speed.

According to yet another aspect of the present invention, there is provided a method of operating a smart radio communication system, the method including: determining a download time for a type of each service based on a spectrum efficiency of the optimal channel for each time zone; downloading and storing the content via the optimal channel at the determined download time; and playing the stored content at a predetermined time.

Also, the downloading and the storing of the content may include: downloading and storing a main content corresponding to a main service at the determined download time; and downloading and storing a content corresponding to another service with the same determined download time based on an extra channel capacity of the optimal channel, when downloading the main content.

Also, the receiving of the information may include receiving the information using a common control channel. The common control channel may exist between each of the plurality of RATs and the terminal, or in a frequency band between the base station and the terminal. Here, the common control channel may be provided separately from a data channel including the selected optimal channel.

EFFECT

According to embodiments of the present invention, it is possible to effectively manage limited frequency resources by effectively utilizing time, space, and frequency.

Also, according to embodiments of the present invention, it is possible to construct an optimal channel to be suitable for each service characteristic by effectively utilizing limited frequency resources.

Also, according to embodiments of the present invention, it is possible to perform a communication while changing a frequency band depending on a service type or a user request, based on a spectrum pool.

Also, according to embodiments of the present invention, it is possible to transmit and receive a content by separately using a data channel and a common control channel, to decrease a load due to moving a frequency band while performing a data communication.

Also, according to embodiments of the present invention, it is possible to receive various types of information required to change a frequency band, a bandwidth, and the like depending on a user environment, a service type, and the like, and to thereby prevent time latency and a performance deterioration caused by a change in the frequency band, the bandwidth, and the like.

Also, according to embodiments of the present invention, it is possible to hand off between cells included in a multi-layered cell, based on a velocity, a data rate, and the like, and to thereby perform a communication while changing an optimal channel to be suitable for a situation.

Also, according to embodiments of the present invention, it is possible to provide various types of radio communication services based on a spectrum efficiency and to thereby enhance efficiency of frequency utilization and improve economical gains.

Also, according to embodiments of the present invention, it is possible to perform a communication via a Common Pilot Channel Base Station (CPC BS) and to thereby reduce an equity problem between providers that may occur when a Global Control Plane (GCP) unilaterally allocates an optimal channel to a smart radio terminal.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
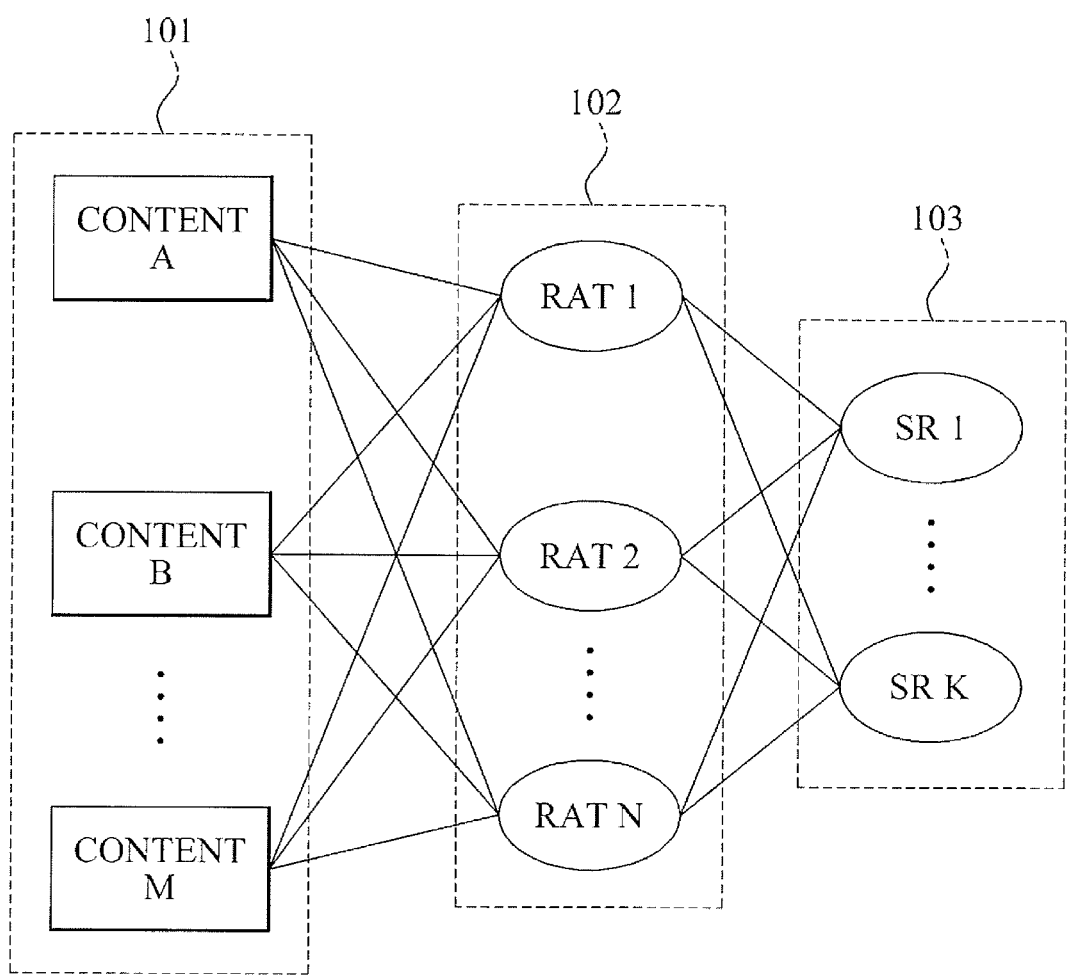
FIG. 1 is a diagram illustrating a network configuration of a smart radio communication system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a network configuration of a smart radio (SR) communication system according to an embodiment of the present invention.

Referring to FIG. 1, the SR communication system may provide voice and video services, and may also provide various types of contents 101 suitable for a user request in a ubiquitous system.

In order to simultaneously receive different services, SR terminals 102 may include a function capable of simultaneously accessing different radio access technologies (RATs) 103. Also, the SR terminals 102 may construct an optimal channel suitable for each service characteristic by considering a radio channel environment through a cooperation with the RATs 103, and by effectively using limited resources such as time, space, frequency, and the like.

Figure 2:
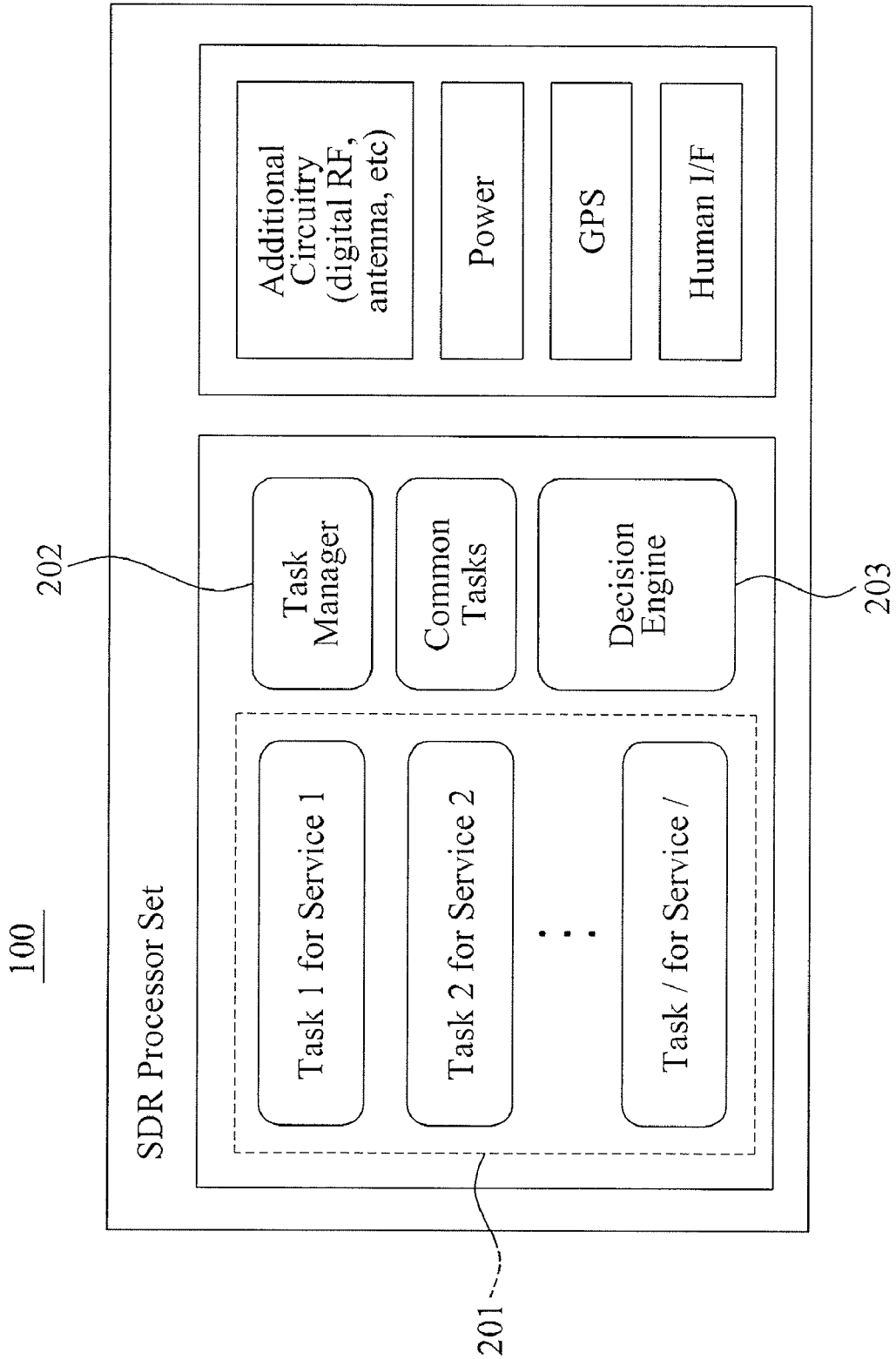
FIG. 2 is a diagram illustrating a structure of a smart radio terminal according to an embodiment of the present invention.

FIG. 2 is a diagram illustrating a structure of an SR terminal 100 according to an embodiment of the present invention.

Referring to FIG. 2, the SR terminal 100 may include a Software Defined Radio (SDR) based platform for a universal access that may communicate via any standard of RATs in a ubiquitous environment. The SR terminal 100 may include a function that enables each of tasks 201 to independently operate based on the SDR based platform. Each of the tasks 201 may perform a communication for each of services.

The SR terminal 100 may include a task manager 202 that may manage the plurality of tasks 201, and a decision engine 203 for an algorithm that may intelligently select an optimal channel for each of the services. The SR terminal 10 may select the optimal channel for each of the services through a communication with the plurality of RATs.

Figure 3:
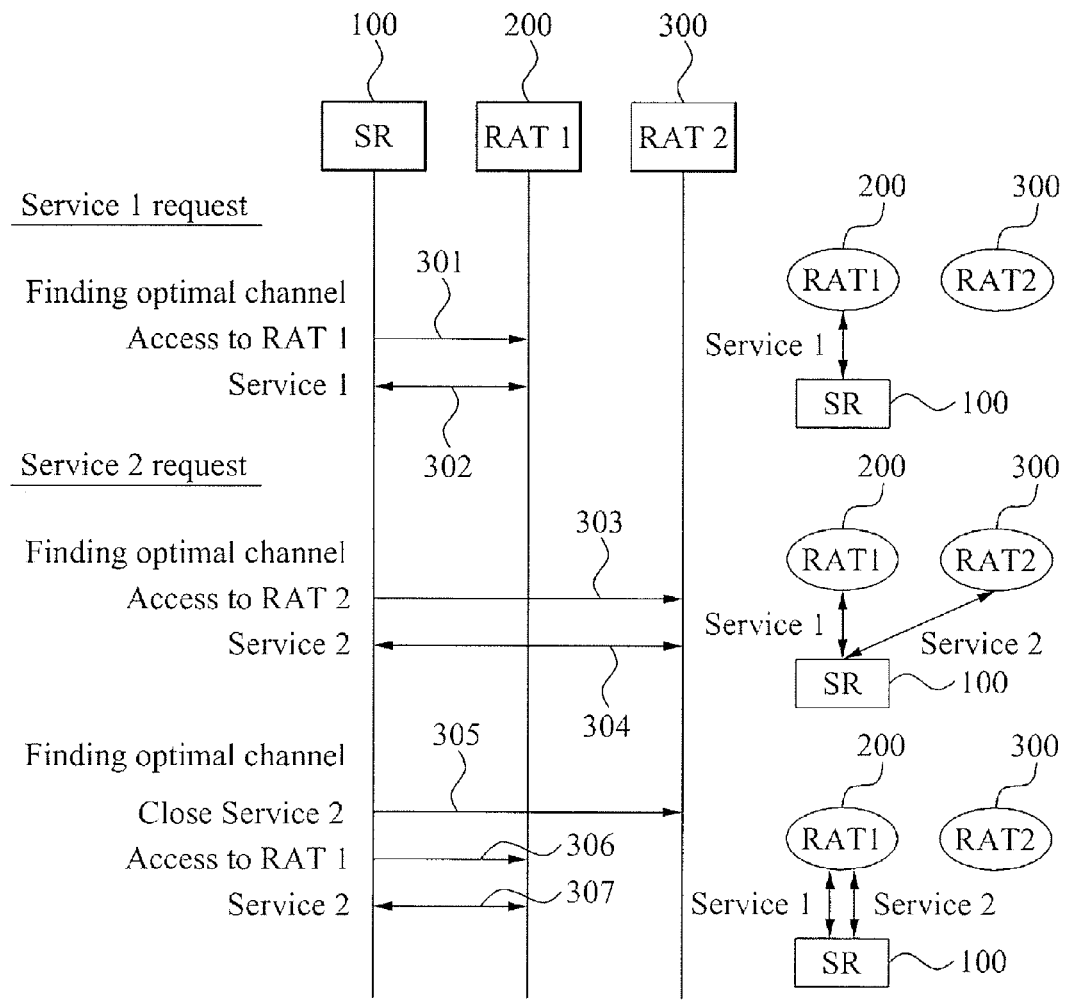
FIG. 3 is a flowchart for describing a method of operating a smart radio communication system according to an embodiment of the present invention.

FIG. 3 is a flowchart for describing a method of operating an SR communication system according to an embodiment of the present invention.

Referring to FIG. 3, in operation 301, an SR terminal 100 may access a first RAT (RAT1) 200 to request a first service (service 1). Here, the SR terminal 100 may receive information associated with the RAT (1) 200, for example, a channel status and the like, through an access to the RAT (1) 200, and may determine whether a first channel between the SR terminal 100 and the RAT (1) 200 is an optimal channel for the first service.

When it is determined the first channel is the optimal channel for the first service, the SR terminal 100 may receive a content corresponding to the first service via the first channel in operation S302.

In operation S303, the SR terminal 100 may access a second RAT (RAT 2) 300 to request a second service (service 2). Here, the SR terminal 100 may receive information associated with the RAT (2) 300, for example, a channel status and the like, through an access to the RAT (2) 300, and may determine whether a second channel between the SR terminal 100 and the RAT (2) 300 is an optimal channel for the second service.

When it is determined the second channel is the optimal channel for the second service, the SR terminal 100 may receive a content corresponding to the second service via the second channel in operation 304. Conversely, when it is determined the second channel is not the optimal channel for the second service, the SR terminal 100 may terminate the access to the RAT (2) 300 in operation 305, and access the RAT (1) 200 in operation 306.

When a channel is determined between the SR terminal 100 and the terminal (1) 200, that is, the first channel being the optimal channel for the second service through the access to the RAT (1) 200, the SR terminal 100 may receive the content corresponding to the second service via the first channel in operation 307.

Figure 4:
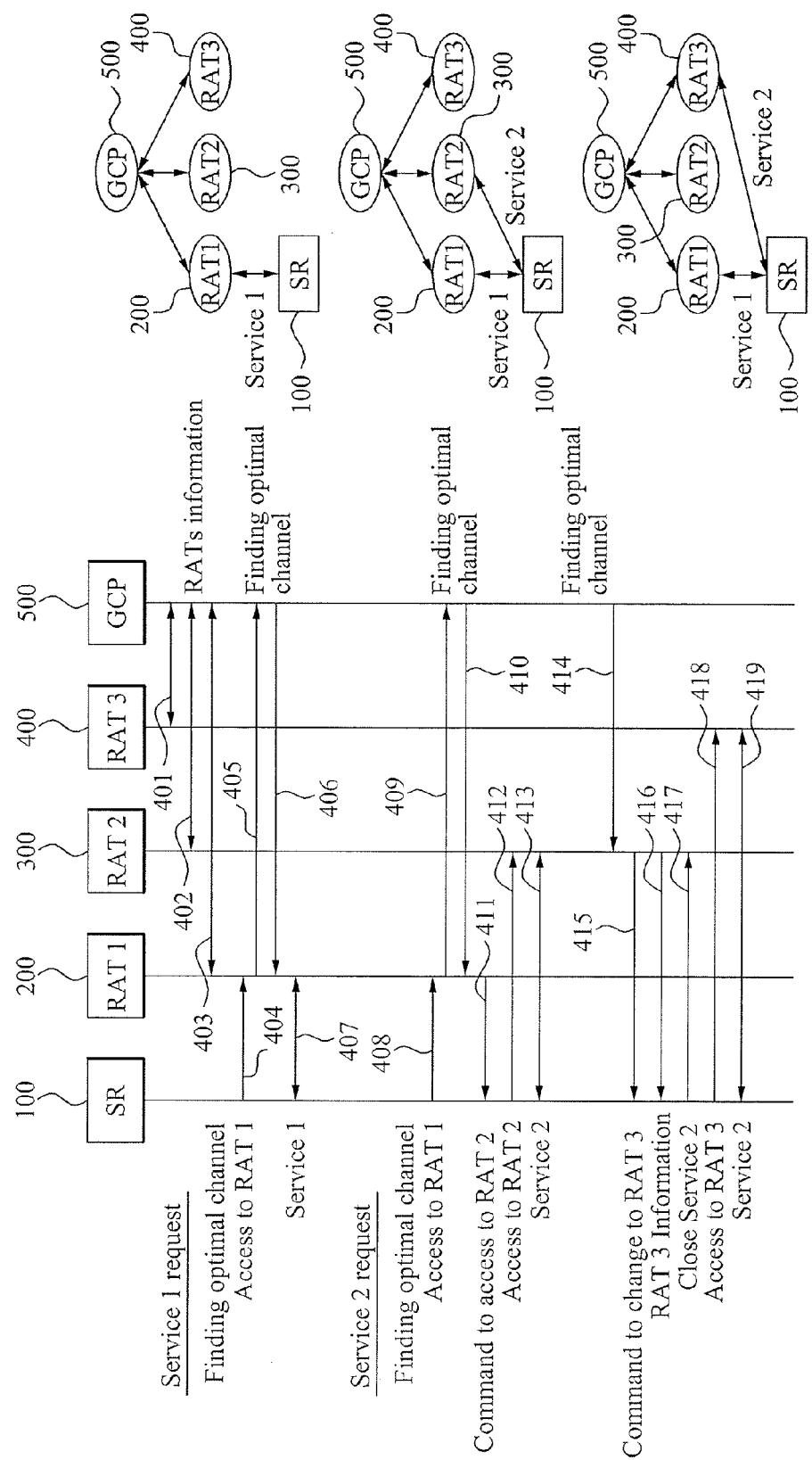
FIG. 4 is a flowchart for describing a method of operating a smart radio communication system according to another embodiment of the present invention.

FIG. 4 is a flowchart for describing a method of operating an SR communication system according to another embodiment of the present invention.

Referring to FIG. 4, in operations 401, 402, and 403, a Global Control Plane (GCP) 500 may access a first RAT (RAT 1) 200, a second RAT (RAT 2) 300, and a third RAT (RAT 3) 400 to collect information associated with the RAT (1) 200, the RAT (2) 300, and the RAT (3) 400. For example, the information may include a channel status of each of the RAT (1) 200, the RAT (2) 300, and the RAT (3) 400, and the like.

In operation 404, the SR terminal 100 may access the RAT (1) 200 to request a first service (service 1). In this instance, when accessing the RAT (1) 200, the SR terminal 100 may transmit, to the RAT (1) 200, information associated with the first service, for example, a type of the first service, and the like.

In operation 405, the RAT (1) 200 may transfer the type of the first service and the like to the GCP 500. The GCP 500 may determine whether a first channel between the SR terminal 100 and the RAT (1) 200 is an optimal channel for the first service, based on the information such as the type of the first service, the channel status with the RAT (1) 200, and the like.

When it is determined the first channel is the optimal channel, the GCP 500 may inform the RAT (1) 200 that the first channel is the optimal channel in operation 406. In operation 407, the RAT (1) 200 may transmit, to the SR terminal 100, a content corresponding to the first service via the first channel. Accordingly, the SR terminal 100 may output the content corresponding to the first service, and provide a user with the output content.

In operation 408, the SR terminal 100 may access the RAT (1) 200 to request a second service (service 2). When accessing the RAT (1) 200, the SR terminal 100 may transmit, to the RAT (1) 200, information associated with the second service, for example, a type of the second service and the like.

In operation 409, the RAT (1) 200 may transfer the type of the second service and the like to the GCP 500. The GCP 500 may determine a channel between the SR terminal 100 and the RAT (1) 200, that is, the first channel being the optimal channel for the second service, based on the information such as the type of the second service, the channel status with the RAT (1) 200, and the like.

When it is determined the first channel is not the optimal channel, the GCP 500 may select the optimal channel based on the collected information, that is, information associated with each of the RAT (1) 200, the RAT (2) 300, and the RAT (3) 400, a type of the second service and the like. When the selected optimal channel is the second channel between the SR terminal 100 and the RAT (2) 300, the GCP 500 may transmit an access change command to use the RAT (2) 300 in operation 410.

In operation 411, the RAT (1) 200 may receive the access change command to use the RAT (2) 300, and transfer the received access change command to the SR terminal 100. In operation 412, the SR terminal 100 may access the RAT (2) 300 in response to the access change command to use the RAT (2) 300. In operation 413, the SR terminal 100 may transmit, to the SR terminal 100, a content corresponding to the second service via the second channel. Accordingly, the SR terminal 100 may output the content corresponding to the second service, and provide the user with the output content.

Next, the GCP 500 may find the optimal channel again. When the second channel is no longer the optimal channel for the second service, the GCP 500 may transmit, to the RAT (2) 300, an access change command to use the RAT (3) 400 in operation 414. In operation 415, the RAT (2) 300 may receive the access change command to use the RAT (3) 400, and transfer the received access change command to the SR terminal 100. In operation 416, the RAT (2) 300 may transfer, to the SR terminal 100, information associated with the RAT (3) 400 that is received from the GCP 500.

The SR terminal 100 may terminate the access to the RAT (2) 300 in operation 417, and may access the RAT (3) 400 according to the access change command to use the RAT (3) 400 in operation 418. Here, the SR terminal 100 may access the RAT (3) 400 using information associated with the RAT (3) 400. In operation 419, the RAT (3) 400 may transmit, to the SR terminal 100, a content corresponding to the second service via a third channel between the RAT (3) 400 and the SR terminal 100. Accordingly, the SR terminal 100 may output the content corresponding to the second service, and provide the user with the output content.

Figure 5:
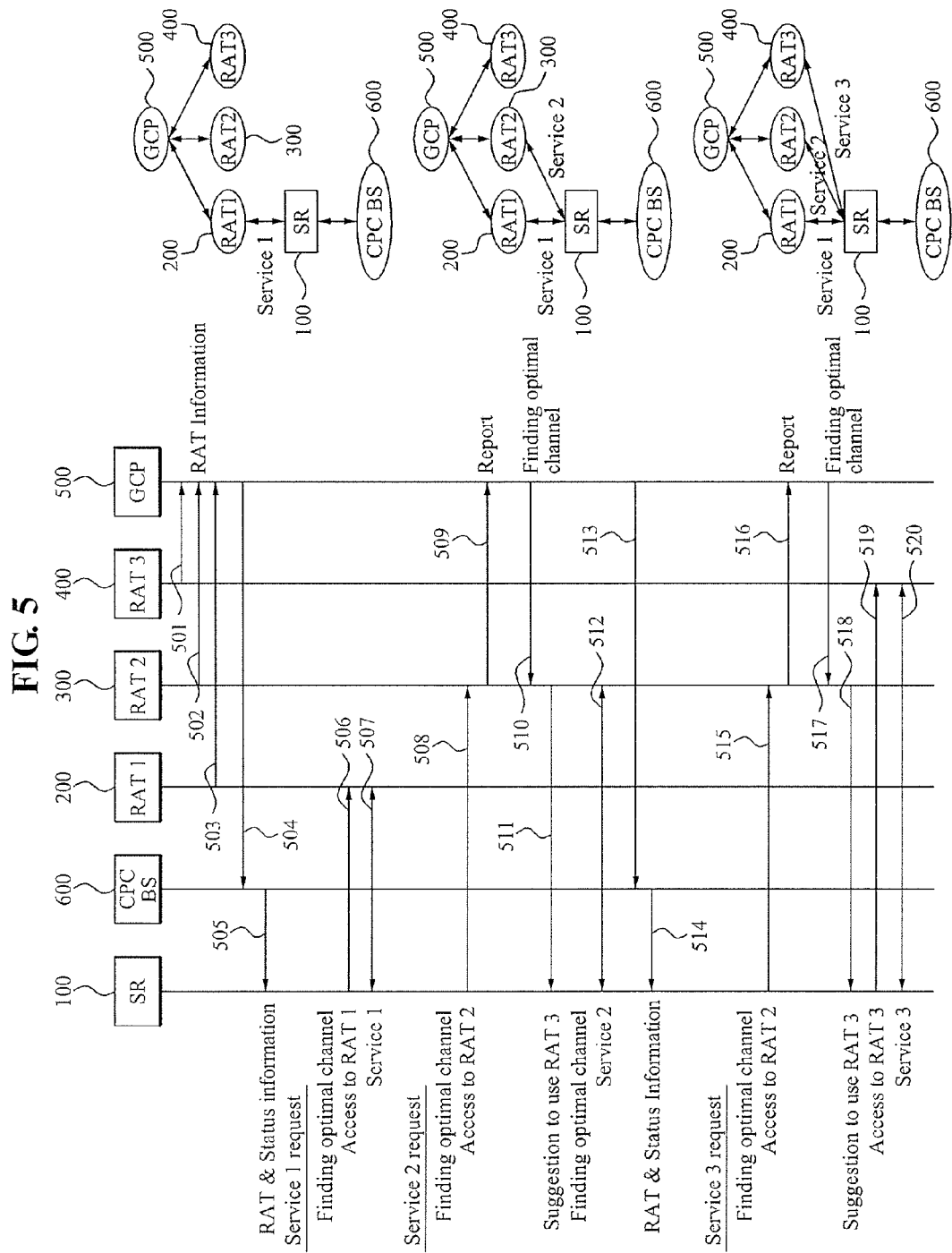
FIG. 5 is a flowchart for describing a method of operating a smart radio communication system according to still another embodiment of the present invention.

FIG. 5 is a flowchart for describing a method of operating an SR communication system according to still another embodiment of the present invention.

Referring to FIG. 5, in operations 501, 502, and 503, a GCP 500 may access a first RAT (RAT 1) 200, a second RAT (RAT 2) 300, and a third RAT (RAT 3) 400 to collect information associated with the RAT (1) 200, the RAT (2) 300, and the RAT (3) 400. For example, the information may include a channel status of each of the RAT (1) 200, the RAT (2) 300, and the RAT (3) 400, and the like.

In operation 504, the GCP 500 may transmit the collected information to a Common Pilot Channel Base Station (CPC BS) 600. In operation 505, the CPC BS 600 may receive the collected information and transfer the information to an SR terminal 100.

When at least two RATs of different providers exist among the RAT (1) 200, the RAT (2) 300, and the RAT (3) 400, that is, when at least two RATs of different providers are mixed, the CPC BS 600 may be provided in order to decrease an equity problem that may occur when the GCP 500 unilaterally allocates an optimal channel to the SR terminal 100.

According to the present embodiment, information collected by the GCP 500 may be transmitted to the SR terminal 100 via the CPC BS 600. Accordingly, it is possible to enable the SR terminal 100 to select an optimal channel for a predetermined service based on the collected information, thereby decreasing the equity problem.

Next, in order to request a first service (service 1), the SR terminal 100 may select an optimal channel for the first service using the collected information. When the selected optimal channel is a first channel between the SR terminal 100 and the RAT (1) 200, the SR terminal 100 may access the RAT (1) 200 in operation 506. In operation 507, the RAT (1) 200 may transmit, to the SR terminal 100, a content corresponding to the first service via the first channel. Accordingly, the SR terminal 100 may output the content corresponding to the first service, and provide the user with the output content.

In order to request a second service (service 2), the SR terminal 100 may select an optimal channel for the second service using the collected information. When the selected optimal channel is a second channel between the SR terminal 100 and the RAT (2) 300, the SR terminal 100 may access the RAT (2) 300 in operation 508. In operation 509, the RAT (2) 300 may report, to the GCP 500, information associated with the second service, for example, a type of the second service and the like.

Next, the GCP 500 may determine whether the second channel between the SR terminal 100 and the RAT (2) 300 is the optimal channel for the second service, based on the information such as the type of the second service, a channel status of the RAT (2) 300, and the like.

When it is determined the second channel is not the optimal channel, the GCP 500 may transmit, to the RAT (2) 300, an access change suggestion to use the RAT (3) 400 in operation 510. In operation 511, the RAT (2) 300 may transfer, to the SR terminal 100, the access change suggestion to use the RAT (3) 400. Specifically, the GCP 500 may suggest the SR terminal 100 to change an access to the RAT (3) 400 based on the entire system performance.

In operation 512, the SR terminal 100 may disregard the access change suggestion to use the RAT (3) 400 and thereby may maintain the access with the RAT (2) 300. In this case, the SR terminal 100 may receive a content corresponding to the second service via the second channel that is the optimal channel selected by the SR terminal 100. Accordingly, the SR terminal 100 may output the content corresponding to the second service, and provide the user with the output content.

In operation 513, the GCP 500 may transmit the collected information, that is, updated information, to the CPC BS 600.

In operation 514, the CPC BS 600 may receive the collected information and transfer the received information to the SR terminal 100.

In order to request a third service (service 3), the SR terminal 100 may select an optimal channel for the third service using the collected information. When the selected optimal channel is the second channel between the SR terminal 100 and the RAT (2) 300, the SR terminal 100 may access the RAT (2) 300 in operation 515. In operation 516, the RAT (2) 300 may report, to the GCP 500, information associated with the third service, for example, a type of the third service and the like.

The GCP 500 may determine whether the second channel is an optimal channel for the third service based on the information such as the type of the third service, a channel status of the RAT (2) 300, and the like. When it is determined the second channel is not the optimal channel, the GCP 500 may transmit, to the RAT (2) 300, an access change suggestion to use the RAT (3) 400 in operation 517. In operation 518, the RAT (2) 300 may transfer, to the SR terminal 100, the access change suggestion to use the RAT (3) 400. The RAT (2) 300 may transfer, to the SR terminal 100, information associated with the RAT (3) 400 that is received from the GCP 500.

In operation 519, the SR terminal 100 may accept the access change suggestion to use the RAT (3) 400 to terminate the access to the RAT (2) 400, and then access the RAT (3) 400 according to the access change suggestion. Here, the SR terminal 100 may access the RAT (3) 400 using information associated with the RAT (3) 400.

Next, the SR terminal 100 may receive a content corresponding to the third service via a third channel between the SR terminal 100 and the RAT (3) 400. Accordingly, the SR terminal 100 may output the content corresponding to the third service, and provide the user with the output content.

Figure 6:
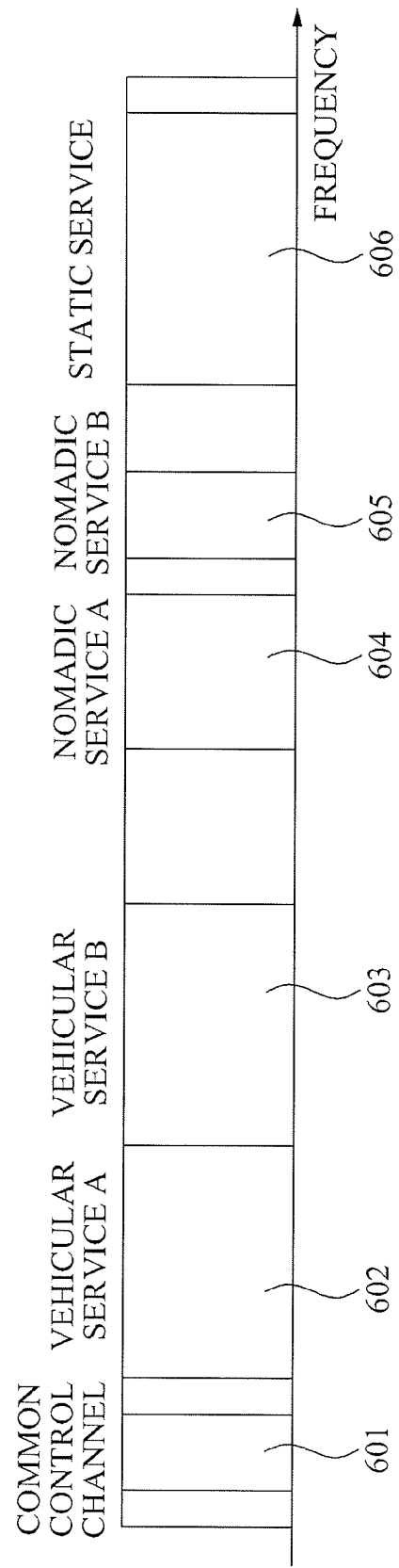
FIG. 6 is a diagram illustrating an example of providing a smart service for each frequency band based on a spectrum pool according to an embodiment of the present invention.

FIG. 6 is a diagram illustrating an example of providing a smart service for each frequency band based on a spectrum pool according to an embodiment of the present invention.

As shown in FIG. 6, in the case of vehicular services A and B, an SR terminal may select low frequency bands 602 and 603 as an optimal channel, respectively, to thereby receive the vehicular services A and B. In the case of a static service, the SR terminal may select a high frequency band 606 as an optimal channel to thereby receive the static service. Also, in the case of nomadic services A and B, the SR terminal may select intermediate frequency bands 604 and 605 as an optimal channel, respectively, to thereby receive the nomadic services A and B.

Specifically, the SR terminal may perform a communication while changing a frequency band according to a service type or a user request, based on the spectrum pool. More specifically, the SR terminal may change an optimal channel according to the service type or the user request based on the spectrum pool, and provide a service via the changed optimal channel.

For example, when a velocity of the SR terminal is fast, the SR terminal may initially change a frequency band to a low frequency band and then receive a service. Through this, it is possible to decrease an effect by a Doppler spectrum and to enhance a performance. Also, when the SR terminal requires large amounts of data in a static environment, the SR terminal may change a frequency band and a bandwidth to a high frequency band and a wide bandwidth, and receive the service using the changed frequency band and bandwidth.

Also, the SR terminal may receive, via a common control channel 601, various types of information that is required to change the frequency band, the bandwidth, and the like according to the user environment or the service type. Through this, it is possible to prevent time latency and a performance deterioration caused by a change in the frequency band, the bandwidth, and the like. Here, the common control channel 601 may exist between each of RATs and the SR terminal, or in a frequency band between a CPC BS and the SR terminal. In this instance, the common control channel 601 may be provided separately from a data channel including an optimal channel for each service.

Figure 7:
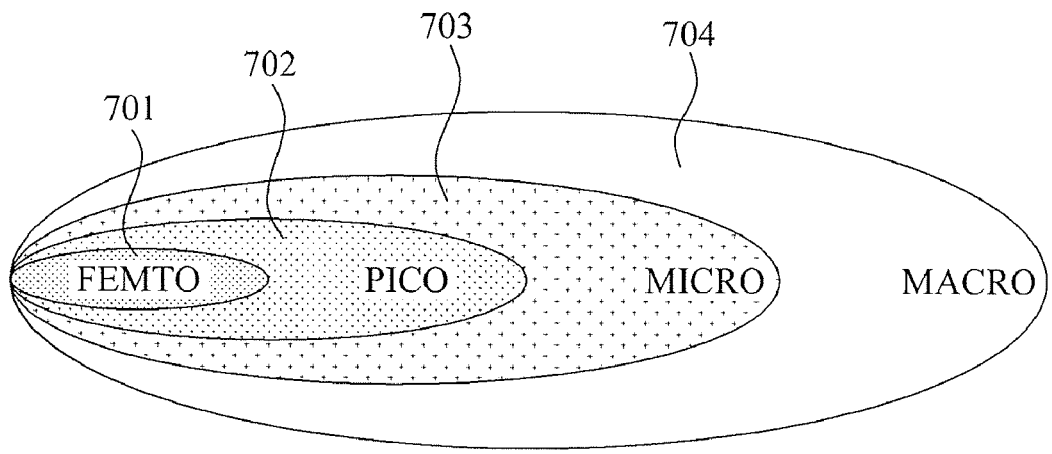
FIG. 7 is a diagram illustrating an example of providing a smart service for each space based on a multi-layered cell according to an embodiment of the present invention.

FIG. 7 is a diagram illustrating an example of providing a smart service for each space based on a multi-layered cell according to an embodiment of the present invention.

As shown in FIG. 7, an SR terminal may access a cell such as a femto cell 701, a pico cell 702, a micro cell 703, a macro cell 704, and the like, based on a velocity, a data rate, and the like, and thereby enable a service access via an optimal channel. Specifically, the SR terminal may hand off between cells included in the multi-layered cell, based on the velocity, the data transmission rate, and the like, and thereby perform a communication while changing an optimal channel to be suitable for a situation.

For example, it is assumed here that the SR terminal receives a radio service via a base station of the pico cell 702 in a static status and then moves. In this case, when the SR terminal maintains a communication channel via the pico cell 702, it may be ineffective due to frequency handoff. Accordingly, the SR terminal may change a channel to receive the service via the micro cell 703.

As another example, it is assumed that the SR terminal demands a wideband broadcasting service in a static status. In this case, when setting a communication channel via the macro cell 704, it may be optimal for the SR terminal. Accordingly, the SR terminal may receive the wideband broadcasting service via the macro cell 704.

Figure 8:
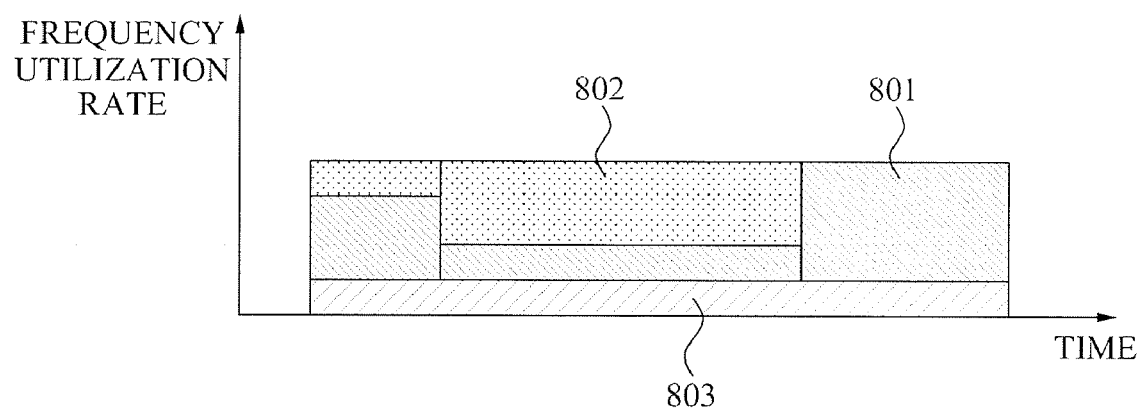
FIG. 8 is a graph illustrating an example of a smart convergence service for each time zone for enhancing efficiency of frequency utilization according to an embodiment of the present invention.

FIG. 8 is a graph illustrating an example of a smart convergence service for each time zone for enhancing efficiency of frequency utilization according to an embodiment of the present invention.

A radio channel may have a great deviation with respect to its use amount for each time zone. For example, in the case of a cellular mobile communication system of an urban area, a frequency utilization load may be high in a commuting time zone, whereas the frequency utilization load may significantly decrease in the hours around midnight. Accordingly, as shown in FIG. 8, it is possible to enhance an added value of frequency by appropriately combining a real-time service 801, a non-real time service 802, a broadcasting service 803, and the like so that the efficiency of frequency utilization may be maximized at all times.

Specifically, according to an embodiment of the present invention, a download time may be determined for each service type based on a spectrum efficiency of an optimal channel for each time zone. A content corresponding to a service may be transmitted to an SR terminal at the determined download time. In this instance, when a plurality of service types has the same download time, a main content corresponding to a main service may be transmitted to the SR terminal at the determined download time. Contents corresponding to the remaining services excluding the main service among the plurality of service types with the same download time may be transmitted to the SR terminal based on an extra channel capacity of the optimal channel when transmitting the main content. As described above, according to an embodiment of the present invention, it is possible to combine various types of radio communication services based on a spectrum efficiency, and to thereby provide the radio communication services.

For example, every time a system user desires to use a $3^{rd}$ generation (3G) based cellular mobile communication system or a wireless broadband (WiBro) system, the system user may use a voice service or a data service corresponding to a basic fee, for example, a voice communication, web browsing, and the like. However, when using time zone where frequency is idle, a system may provide the main service and also a video service or a broadcasting service such as a video on demand (VOD), an Internet Protocol Television (IPTV), and the like, an e-subscription function, an e-education function, a navigator function, and the like. Accordingly, it is possible to enhance the efficiency of frequency utilization, and improve economical gains.

Figure 9:
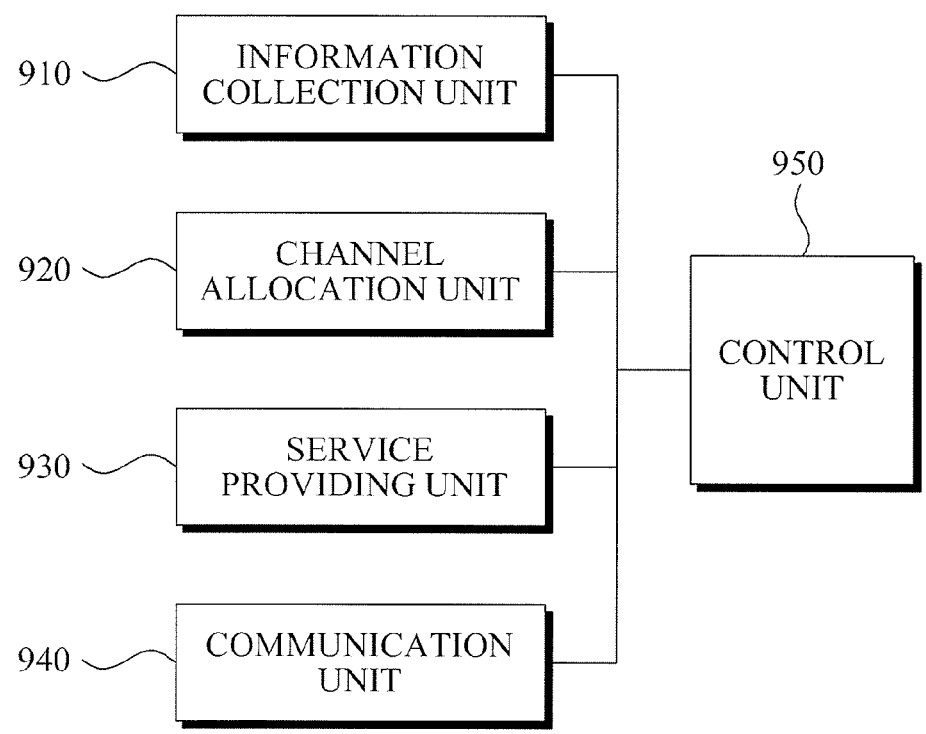
FIG. 9 is a block diagram illustrating a smart radio communication system according to an embodiment of the present invention.

FIG. 9 is a block diagram illustrating an SR communication system 900 according to an embodiment of the present invention. Here, the SR communication system 900 may be provided in a channel allocation apparatus, for example, the GCP 500 of FIGS. 4 and 5.

Referring to FIG. 9, the SR communication system 900 may include an information collection unit 910, a channel allocation unit 920, a service providing unit 930, a communication unit 940, and a control unit 950.

The information collection unit 910 may collect information associated with each of a plurality of RATs through a cooperation with the plurality of RATs.

The channel allocation unit 920 may allocate, to a terminal, an optimal channel for each of services, using the collected information. Here, the channel allocation unit 920 may change the allocated optimal channel based on at least one of a velocity of the terminal receiving a corresponding service, and a data transmission rate requested by the terminal.

Specifically, the channel allocation unit 920 may generate N terminal groups based on a number N of available frequency bands, and allocate a different available frequency band to each of the N terminal groups based on at least one of the velocity and the data transmission rate to thereby change the allocated optimal channel. Here, N denotes a natural number.

Figure 11:
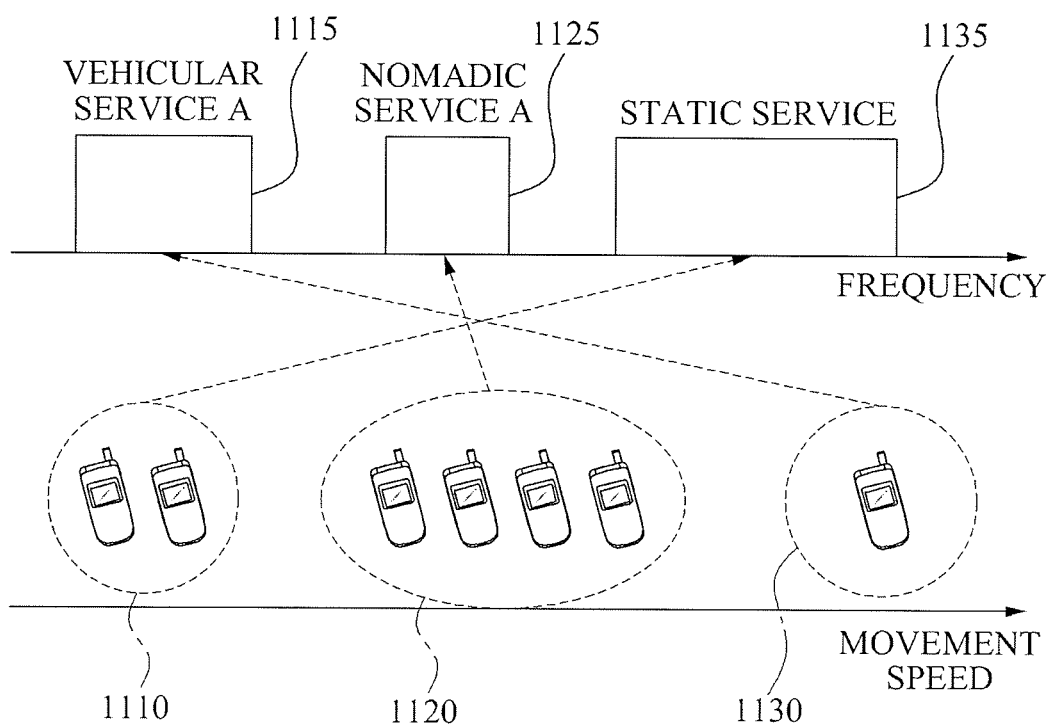
FIG. 11 illustrates an example of changing an allocated optimal channel according to an embodiment of the present invention.

For example, the channel allocation unit 920 may classify user terminals into a number of terminal groups corresponding to a number of available frequency bands according to the velocity of the terminal using the service. The channel allocation unit 920 may allocate a relatively high frequency band in an order from a user terminal with a relatively low velocity to a user terminal with a relatively fast velocity, based on a user request, a network situation, and the like. Hereinafter, changing an allocated optimal channel as above will be described with reference to FIG. 11. FIG. 11 illustrates an example of changing an allocated optimal channel according to an embodiment of the present invention.

As shown in FIG. 11, when three different frequency bands are used, the channel allocation unit 920 may classify terminals into three terminal groups 1110, 1120, and 1130, and then allocate a corresponding frequency band to a terminal included in each of the terminal groups 1110, 1120, and 1130. Specifically, the channel allocation unit 920 may allocate a frequency band 1135 of a static service to a terminal of the terminal group 1110, allocate a frequency band 1125 of a nomadic service A to a terminal of the terminal group 1120, and allocate a frequency band 1115 of a vehicular service A to a terminal of the terminal group 1130. As described above, the channel allocation unit 920 may change the allocated optimal channel by changing the frequency band based on the velocity.

Figure 12:
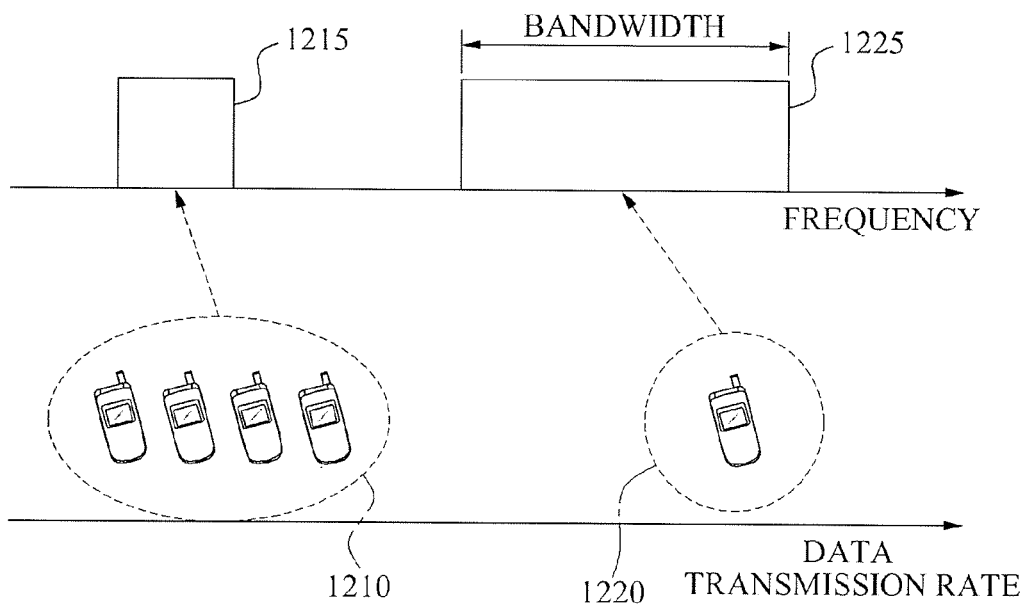
FIG. 12 illustrates another example of changing an allocated optimal channel according to an embodiment of the present invention.

As another example, the channel allocation unit 920 may classify user terminals into a number of terminal groups corresponding to a number of available frequency bands according to a data transmission rate requested by a terminal using the service. The channel allocation unit 920 may allocate a frequency band with a relatively wide bandwidth in an order from a user terminal with a relatively high data transmission rate to a user terminal with a relatively low data transmission rate based on a user request, a network situation, and the like. Hereinafter, it will be described in detail with reference to FIG. 12. FIG. 12 illustrates another example of changing an allocated optimal channel according to an embodiment of the present invention.

As shown in FIG. 12, when two different frequency bands are used, the channel allocation unit 920 may classify terminals into two terminal groups 1210 and 1220 and then allocate a corresponding frequency band to a terminal of each of the terminal groups 1210 and 1220. Specifically, the channel allocation unit 920 may allocate a frequency band 1215 with a relatively narrow bandwidth to a terminal of the terminal group 1210, and allocate a frequency band 1225 with a relatively wide bandwidth to a terminal of the terminal group 1220. As described above, the channel allocation unit 920 may change the allocated optimal channel by allocating the frequency band based on the data transmission rate.

Also, the channel allocation unit 920 may generate M terminal groups based on a number M of layers of a multi-layered cell, and allocate a cell of a different layer to each of the M terminal groups based on at least one of the velocity and the data transmission rate to thereby change the allocated optimal channel. Here, M denotes a natural number.

Figure 13:
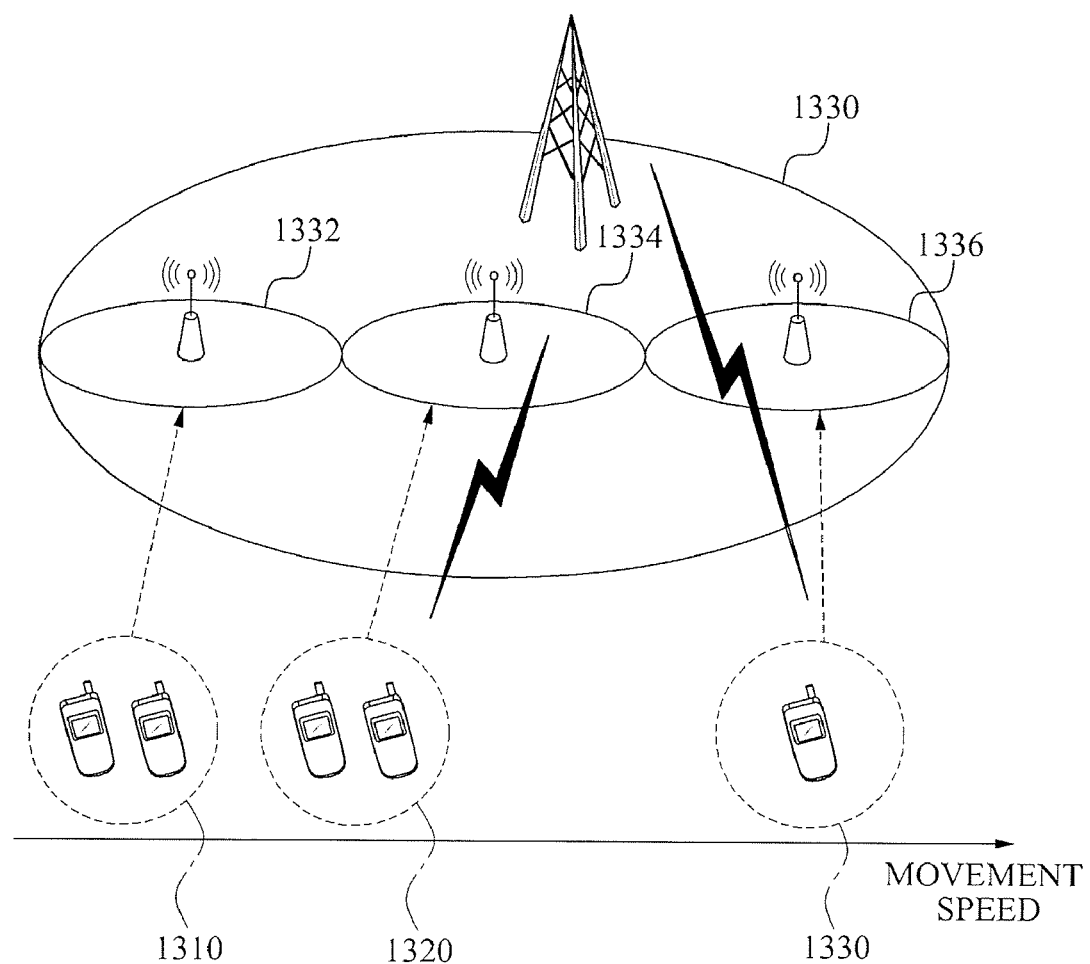
FIG. 13 illustrates still another example of changing an allocated optimal channel according to an embodiment of the present invention.

For example, the channel allocation unit 920 may classify user terminals as many as a number of available layers of available cells included in the multi-layered cell according to the velocity of a terminal using a corresponding service. The channel allocation unit 920 may allocate a cell with a relatively small radius in an order from a user terminal with a relatively slow velocity to a user terminal with a relatively fast velocity based on a user request, a network situation, and the like. Hereinafter, changing an allocated optimal channel as above will be described with reference to FIG. 13. FIG. 13 illustrates still another example of changing an allocated optimal channel according to an embodiment of the present invention.

As shown in FIG. 13, when three cells 1332, 1334, and 1336 exist in a multi-layered cell 1330, the channel allocation unit 920 may classify user terminals into three groups 1310, 1320, and 1330 and allocate a corresponding to a terminal of each of the groups 1310, 1320, and 1330. Specifically, the channel allocation unit 920 may allocate a cell 1332 with a relatively small radius to a terminal of the group 1310, allocate a cell 1334 with an intermediate radius to a terminal of the group 1320, and allocate a cell 1336 with a relatively large radius to a terminal of the group 1330. As described above, the channel allocation unit 920 may change the allocated optimal channel by allocating a cell based on the velocity.

The service providing unit 930 may classify each of the services into a primary service and a secondary service based on a spectrum efficiency of the allocated optimal channel for each time zone, and thereby provide each of the services.

Figure 14:
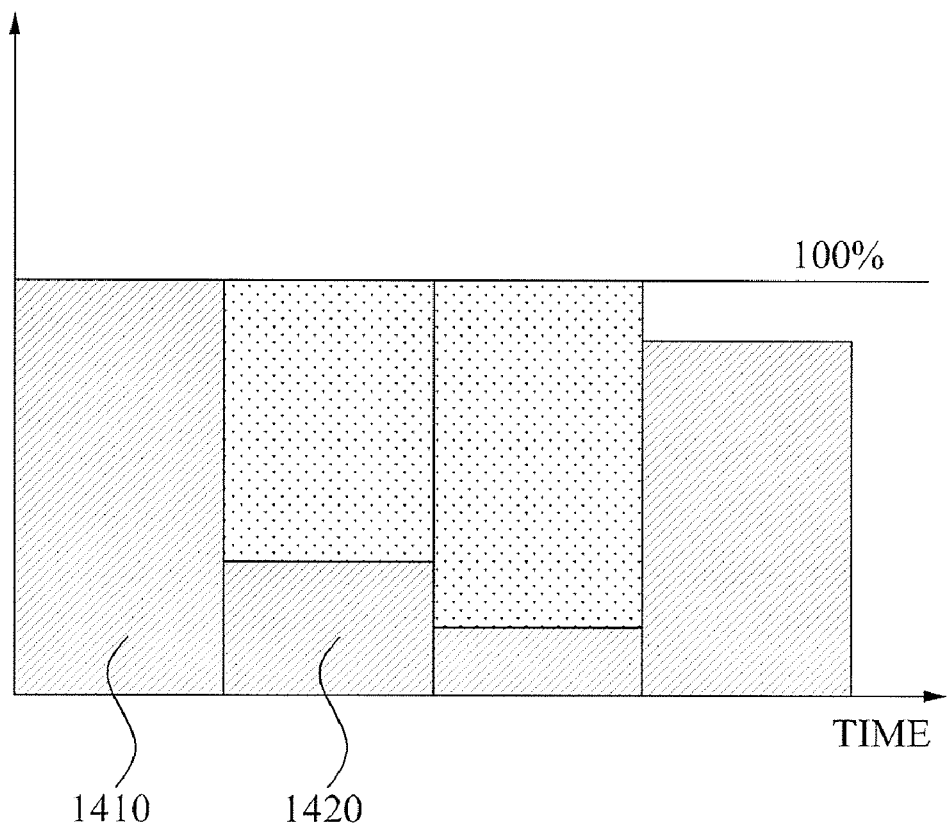
FIG. 14 is a graph illustrating an example of providing a service according to an embodiment of the present invention.

For example, as shown in FIG. 14, the service providing unit 930 may classify each of the services into the primary service and the secondary service based on the spectrum efficiency of the allocated optimal channel for each time zone. Next, the service providing unit 930 may initially provide the terminal with the primary service via a channel with a largest channel capacity, and subsequently provide the terminal with the secondary service via the remaining channel. FIG. 14 is a graph illustrating an example of providing a service according to an embodiment of the present invention.

The communication unit 940 may transmit, to and from the terminal, information associated with setting or canceling of the allocated optimal channel using a control channel. Here, the control channel denotes a channel that is separately provided from a data channel including the allocated optimal channel.

The control unit 950 may control an operation of the SR communication system according to an embodiment of the present invention, that is, control a general operation of the information collection unit 910, the channel allocation unit 920, the service providing unit 930, the communication unit 940, and the like.

Figure 10:
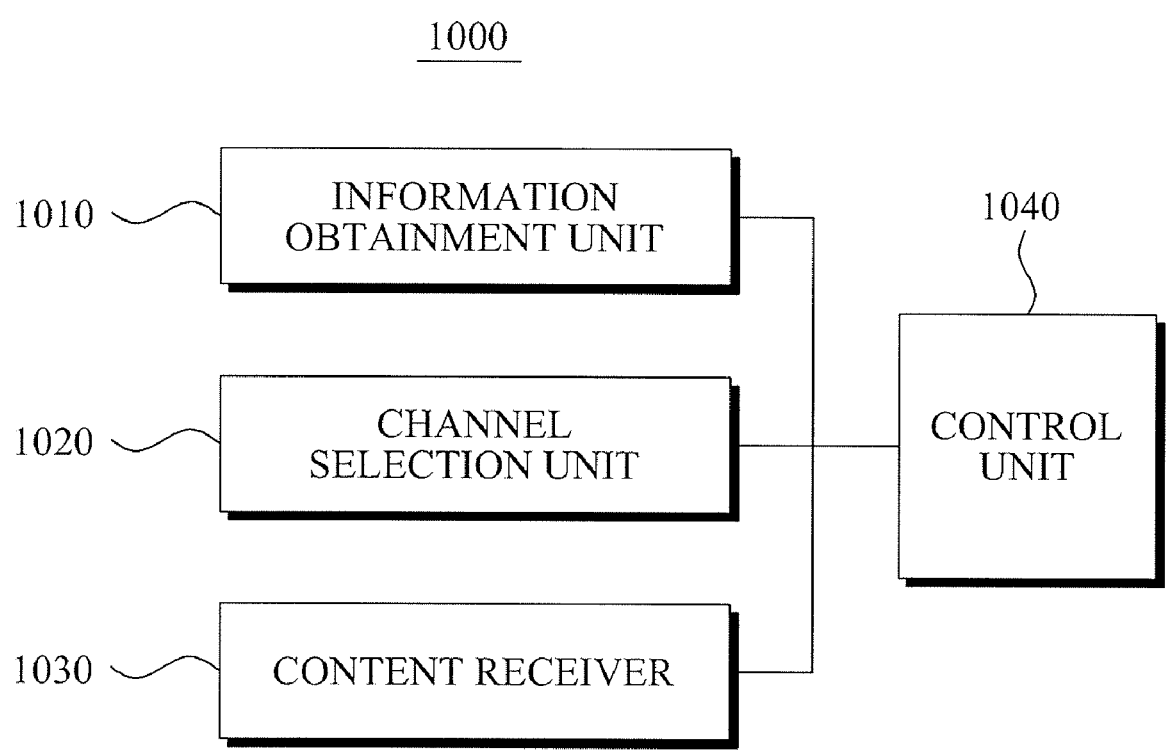
FIG. 10 is a block diagram illustrating a smart radio communication system according to another embodiment of the present invention.

FIG. 10 is a block diagram illustrating an SR communication system 1000 according to another embodiment of the present invention. Here, the SR communication system may be installed in the SR terminal 100 of FIGS. 3, 4, and 5.

Referring to FIG. 10, the SR communication system may include an information obtainment unit 1010, a channel selection unit 1020, a content receiver 1030, and a control unit 1040.

The information obtainment unit 1010 may obtain information associated with each of a plurality of RATs through a cooperation with the plurality of RATs.

The channel selection unit 1020 may select an optimal channel for each of services, using the collected information. Here, the channel selection unit 1020 may change the selected optimal channel based on at least one of a velocity of a terminal and a data transmission rate of the terminal. Also, the channel selection unit 1020 may be allocated with any one frequency band among a plurality of available frequency bands based on at least one of the velocity and the data transmission rate to thereby change the selected optimal channel. Also, the channel selection unit may hand off between cells included in a multi-layered cell, based on at least one of the velocity and the data transmission rate.

The content receiver 1030 may receive a content corresponding to each of the services via the selected optimal channel.

The SR communication system operating method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A smart radio communication system comprising:
   a computer system comprising a processor and a memory;
   an information collection unit operating on the computer system to collect information associated with each of a plurality of radio access technologies (RATs) through a cooperation with the plurality of RATs;
   a channel allocation unit operating on the computer system to allocate, to a terminal, an optimal channel for each of services, using the collected information; and
   a communication unit operating on the computer system to transmit and receive information associated with setting or canceling of the allocated optimal channel using a control channel, wherein the control channel is separately provided from a data channel including the allocated optimal channel,
   wherein the channel allocation unit generates N terminal groups based on a number N of available frequency bands, and allocates a different available frequency band to each of the N terminal groups based on at least one of the velocity and the data transmission rate to thereby change the allocated optimal channel.

2. The smart radio communication system of claim 1, wherein the channel allocation unit changes the allocated optimal channel based on at least one of a velocity of the terminal receiving a corresponding service, and a data rate requested by the terminal.

3. The smart radio communication system of claim 2, wherein the channel allocation unit generates M terminal groups based on a number M of layers of a multi-layered cell, and allocates a cell of a different layer to each of the M terminal groups based on at least one of the velocity and the data transmission rate to thereby change the allocated optimal channel.

4. A method of operating a smart radio communication system, the method comprising:
   collecting information associated with each of a plurality of RATs through a cooperation with the plurality of RATs;
   allocating, to a terminal, an optimal channel for each of services, using the collected information;
   transmitting and receiving information associated with setting or canceling of the allocated optimal channel using a control channel, wherein the control channel is separately provided from a data channel including the allocated optimal channel;
   generating N terminal groups based on a number N of available frequency bands; and
   allocating a different available frequency band to each of the N terminal groups based on at least one of the velocity and the data transmission rate to thereby change the allocated optimal channel.

5. The method of claim 4, further comprising:
   changing the allocated optimal channel based on at least one of a velocity of the terminal receiving a corresponding service, and a data transmission rate requested by the terminal.

6. The method of claim 5, wherein the changing comprises:
   generating M terminal groups based on a number M of layers of a cell that is in a multi-layer structure; and
   allocating a cell of a different layer to each of the M terminal groups based on at least one of the velocity and the data transmission rate to thereby change the allocated optimal channel.

7. A method of operating a smart radio communication system, the method comprising:

collecting information associated with each of a plurality of RATs through a cooperation with the plurality of RATs;

allocating, to a terminal, an optimal channel for each of services, using the collected information;

transmitting and receiving information associated with setting or canceling of the allocated optimal channel using a control channel, wherein the control channel is separately provided from a data channel including the allocated optimal channel;

generating N terminal groups based on a number N of available frequency bands; and allocating a high frequency band from any one of the N terminal groups with a low velocity to any one of the N terminal groups with high velocity terminal with high velocity.

* * * * *